United States Patent
Mishra et al.

(10) Patent No.: US 12,043,677 B2
(45) Date of Patent: Jul. 23, 2024

(54) POLYMERIC EMULSION CONTAINING AMPHOTERIC SURFACTANT AND ITS APPLICATION IN ARCHITECTURAL PRIMERS

(71) Applicant: BEHR PROCESS CORPORATION, Santa Ana, CA (US)

(72) Inventors: Deepak Mishra, Pune (IN); Hemant Nair, Pune (IN); Niranjan Goriwale, Pune (IN); Jigui Li, Irvine, CA (US); Ming-Ren Tarng, Irvine, CA (US)

(73) Assignee: Behr Process Corporation, Santa Ana, CA (US)

( * ) Notice: Subject to any disclaimer, the term of this patent is extended or adjusted under 35 U.S.C. 154(b) by 123 days.

(21) Appl. No.: 17/008,357

(22) Filed: Aug. 31, 2020

(65) Prior Publication Data

US 2022/0064340 A1 Mar. 3, 2022

(51) Int. Cl.

| | | |
|---|---|---|
| *C08F 220/06* | (2006.01) | |
| *C08F 2/24* | (2006.01) | |
| *C08F 20/06* | (2006.01) | |
| *C08F 20/14* | (2006.01) | |
| *C08F 20/18* | (2006.01) | |
| *C08F 220/14* | (2006.01) | |
| *C08F 220/18* | (2006.01) | |
| *C09D 5/00* | (2006.01) | |
| *C09D 5/02* | (2006.01) | |

(52) U.S. Cl.
CPC ............ *C08F 2/24* (2013.01); *C08F 20/06* (2013.01); *C08F 20/14* (2013.01); *C08F 20/18* (2013.01); *C08F 220/06* (2013.01); *C08F 220/14* (2013.01); *C08F 220/18* (2013.01); *C09D 5/002* (2013.01); *C09D 5/022* (2013.01); *C09D 5/024* (2013.01)

(58) Field of Classification Search
None
See application file for complete search history.

(56) References Cited

U.S. PATENT DOCUMENTS

| | | | |
|---|---|---|---|
| 3,852,087 A | 12/1974 | Nordyke et al. | |
| 5,240,982 A * | 8/1993 | Farwaha | C09D 133/06 524/238 |
| 5,399,617 A | 3/1995 | Farwaha et al. | |
| 5,681,880 A | 10/1997 | Désor et al. | |
| 6,113,989 A | 9/2000 | Sinko | |
| 6,225,398 B1 | 5/2001 | Boudreaux et al. | |
| 9,284,457 B2 | 3/2016 | Kelly et al. | |
| 9,469,775 B2 | 10/2016 | Kelly et al. | |
| 9,469,776 B2 | 10/2016 | Kelly et al. | |
| 2003/0119982 A1* | 6/2003 | Pinschmidt, Jr. | C07C 275/10 524/801 |
| 2008/0227668 A1 | 9/2008 | Welton | |
| 2008/0227669 A1 | 9/2008 | Welton | |
| 2014/0072817 A1* | 3/2014 | Simal | C08F 220/68 522/46 |
| 2020/0277421 A1* | 9/2020 | Chen | C08F 236/02 |

FOREIGN PATENT DOCUMENTS

| | | |
|---|---|---|
| CN | 106279505 A | 1/2017 |
| CN | 111303744 A | 6/2020 |
| EP | 2471887 A1 | 7/2012 |
| EP | 2125989 B1 | 9/2012 |
| EP | 2873702 B1 | 12/2016 |

OTHER PUBLICATIONS

Kumthekar, V. et al., "Attributes of the latex emulsion processing and its role in morphology and performance in paints". Progress in Organic Coatings 2011, 72(3), 380-386. (Year: 2011).*
Fithian, P. et al., "Redox for Main Polymerization of Emulsion Polymers", Paint & Coatings Industry, Aug. 1, 2017, retrieved from www.pcimag.com on Jul. 7, 2023. (Year: 2017).*
Arriaga, V. et al., "Branched Vinyl Ester Monomers for Hydrophobic Emulsion Polymers". Paint & Coatings Industry. Nov. 1, 2013. Retrieved from www.pcimag.com on Nov. 16, 2023. (Year: 2013).*
Park, S. H. et al., "Effect of the n-butyl acrylate/2-ethylhexyl acrylate weight ratio on the performances of waterborne core-shell PSAs". Journal of Industrial and Engineering Chemistry 2017, 53, 111-118. (Year: 2017).*
International Search Report and Written Opinion mailed Feb. 12, 2021 for PCT Appn. No. PCT/US2021/048197, 52 pgs.

* cited by examiner

*Primary Examiner* — Richard A Huhn
(74) *Attorney, Agent, or Firm* — Brooks Kushman P.C.

(57) ABSTRACT

A method for forming an acrylic emulsion includes a step of forming pre-emulsion by combining a monomer composition with an amphoteric surfactant in water and then polymerizing the pre-emulsion by combining the pre-emulsion with a radical initiator in a reactor to form a reaction mixture. The monomer composition includes one or more monomers selected from the group consisting of (meth) acrylic acid monomers and (meth)acrylic monomers, and combinations thereof. An acrylic emulsion formed by the method is also provided.

8 Claims, No Drawings

POLYMERIC EMULSION CONTAINING AMPHOTERIC SURFACTANT AND ITS APPLICATION IN ARCHITECTURAL PRIMERS

TECHNICAL FIELD

In at least one aspect, the present invention is related to emulsion polymer compositions that include an amphoteric surfactant.

BACKGROUND

Emulsion polymerization is a well-known technique that is used to form high molecular weight polymers. Typically, these polymers are stabilized by various surfactants such as anionic, cationic and nonionic surfactants. The preparation of this emulsion polymer is described in several patents. Generally, oil-in-water emulsion contains different ethylenic unsaturated monomers such as methyl acrylate, ethyl acrylate, butyl acrylate, methyl methacrylate and vinyl-based monomers such as styrene, vinyl chloride, and vinyl acetate to name some. These monomers are polymerized with an initiator in presence of emulsifier(s) or surfactant(s) which gives stability to the final emulsion.

Apart from stabilizing the emulsion, surfactants have many other roles in setting performance-based properties of an emulsion. Anionic surfactants are good for particle size control and, on the other hand, nonionic surfactant gives steric stabilization and freeze-thaw stability to the emulsion polymer ultimately affecting the property of the final product in which it has been used. Keeping in mind the property enhancement associated with the type of emulsifier, if a surfactant can improve multiple properties of a product where the prepared emulsion is used, it gives significant advantage over other surfactants.

Tannin and corrosion resistance are two properties that are required in primer paint compositions. In water-based architectural coating systems, continuous efforts have been expended to prepare primer paints which can reduce or block leaching/bleeding of tannin through paint. Inorganic components such as zinc, zirconium, aluminum, and the like in the form of pigment or hydroxides and hydrates have been added to paint compositions to make tannin insoluble in water which upon application of the paint ultimately restricts migration of tannin to the surface of the applied coating (see, U.S. Pat. Nos. 3,852,087, 5,681,880A, 6113989). Similar requirements are relevant to corrosion resistance for the primer paint which is improved through zinc-based pigments or other additives.

Accordingly, there is a need for improved methods for making emulsion polymers with improved properties when used as a binder in water-based paint compositions.

SUMMARY

In at least one aspect, the present invention provides a method for forming an acrylic emulsion which includes a step of forming pre-emulsion by combining a monomer composition with an amphoteric surfactant in water and then polymerizing the pre-emulsion by combining the pre-emulsion with a radical initiator in a reactor to form a reaction mixture. The monomer composition includes one or more monomers selected from the group consisting of (meth) acrylic acid monomers and (meth)acrylic monomers, and combinations thereof.

In another aspect, an acrylic emulsion formed by the method set forth herein is also provided.

In another aspect, an amphoteric surfactant gives good control over stability and better hygiene of reactor in synthesis of emulsion polymer. In particular, the emulsion polymer using amphoteric surfactant can provide improved primer properties in water-based architectural coatings.

In still another aspect, paint compositions including the acrylic emulsion set forth herein provides an improvement in tannin and corrosion resistance which is normally achieved only by the addition of special additives or pigments in paint formulations.

In yet another aspect, the emulsion polymer prepared using amphoteric surfactant can be used to prepare water-based primer for architectural coatings. This primer product provides improved tannin and corrosion resistance compared to other architectural coatings prepared using binders based on conventional surfactants. In this regard, the amphoteric surfactant serves the purpose of other additives which are used to improve tannin and corrosion resistance. Application of this binder will help paint formulator to avoid use of additives which often impart other properties such as scrub resistance. Secondly, there is a limit for using additives and pigments such as those based on zinc in paint formulation as higher amounts may generate grits or destabilize the paint.

The foregoing summary is illustrative only and is not intended to be in any way limiting. In addition to the illustrative aspects, embodiments, and features described above, further aspects, embodiments, and features will become apparent by reference to the drawings and the following detailed description.

DETAILED DESCRIPTION

Reference will now be made in detail to presently preferred compositions, embodiments and methods of the present invention, which constitute the best modes of practicing the invention presently known to the inventors. The Figures are not necessarily to scale. However, it is to be understood that the disclosed embodiments are merely exemplary of the invention that may be embodied in various and alternative forms. Therefore, specific details disclosed herein are not to be interpreted as limiting, but merely as a representative basis for any aspect of the invention and/or as a representative basis for teaching one skilled in the art to variously employ the present invention.

Except in the examples, or where otherwise expressly indicated, all numerical quantities in this description indicating amounts of material or conditions of reaction and/or use are to be understood as modified by the word "about" in describing the broadest scope of the invention. Practice within the numerical limits stated is generally preferred. Also, unless expressly stated to the contrary: all R groups (e.g. $R_i$ where i is an integer) include hydrogen, alkyl, lower alkyl, $C_{1-6}$ alkyl, $C_{6-10}$ aryl, $C_{6-10}$ heteroaryl, $-NO_2$, $-NH_2$, $-N(R'R'')$, $-N(R'R''R''')^+L^-$, Cl, F, Br, $-CF_3$, $-CCl_3$, $-CN$, $-SO_3H$, $-PO_3H_2$, $-COOH$, $-CO_2R'$, $-COR'$, $-CHO$, $-OH$, $-OR'$, $-O^-M^+$, $-SO_3^-M^+$, $-PO_3^-M^+$, $-OOO^-M^+$, $-CF_2H$, $-CF_2R'$, $-CFH_2$, and $-CFR'R''$ where R', R'' and R''' are $C_{1-10}$ alkyl or $C_{6-18}$ aryl groups; single letters (e.g., "n" or "o") are 1, 2, 3, 4, or 5; in the compounds disclosed herein a CH bond can be substituted with alkyl, lower alkyl, $C_{1-6}$ alkyl, $C_{6-10}$ aryl, $C_{6-10}$ heteroaryl, $-NO_2$, $-NH_2$, $-N(R'R'')$, Cl, F, Br, $-CF_3$, $-CCl_3$, $-CN$, $-SO_3H$, $-PO_3H_2$, $-COOH$, $-CO_2R'$, $-COR'$, $-CHO$, $-OH$, $-OR'$, $-O^-M^+$, $-SO_3^-M^+$, —$PO_3^-M^+$, —$OOO^-M^+$, —$CF_2H$, —$CF_2R'$, —$CFH_2$, and —$CFR'R''$ where R', R" and R'" are $C_{1-10}$ alkyl or $C_{6-18}$ aryl groups; percent, "parts of," and ratio values are by weight; the term "polymer" includes "oligomer," "copolymer," "terpolymer," and the like; molecular weights provided for any polymers refers to weight average molecular weight unless otherwise indicated; the description of a group or class of materials as suitable or preferred for a given purpose in connection with the invention implies that mixtures of any two or more of the members of the group or class are equally suitable or preferred; description of constituents in chemical terms refers to the constituents at the time of addition to any combination specified in the description, and does not necessarily preclude chemical interactions among the constituents of a mixture once mixed; the first definition of an acronym or other abbreviation applies to all subsequent uses herein of the same abbreviation and applies mutatis mutandis to normal grammatical variations of the initially defined abbreviation; and, unless expressly stated to the contrary, measurement of a property is determined by the same technique as previously or later referenced for the same property.

It is also to be understood that this invention is not limited to the specific embodiments and methods described below, as specific components and/or conditions may, of course, vary. Furthermore, the terminology used herein is used only for the purpose of describing particular embodiments of the present invention and is not intended to be limiting in any way.

It must also be noted that, as used in the specification and the appended claims, the singular form "a," "an," and "the" comprise plural referents unless the context clearly indicates otherwise. For example, reference to a component in the singular is intended to comprise a plurality of components.

The term "comprising" is synonymous with "including," "having," "containing," or "characterized by." These terms are inclusive and open-ended and do not exclude additional, unrecited elements or method steps.

The phrase "consisting of" excludes any element, step, or ingredient not specified in the claim. When this phrase appears in a clause of the body of a claim, rather than immediately following the preamble, it limits only the element set forth in that clause; other elements are not excluded from the claim as a whole.

The phrase "consisting essentially of" limits the scope of a claim to the specified materials or steps, plus those that do not materially affect the basic and novel characteristic(s) of the claimed subject matter.

The phrase "composed of" means "including" or "consisting of." Typically, this phrase is used to denote that an object is formed from a material.

With respect to the terms "comprising," "consisting of," and "consisting essentially of," where one of these three terms is used herein, the presently disclosed and claimed subject matter can include the use of either of the other two terms.

The term "substantially," "generally," or "about" may be used herein to describe disclosed or claimed embodiments. The term "substantially" may modify a value or relative characteristic disclosed or claimed in the present disclosure. In such instances, "substantially" may signify that the value or relative characteristic it modifies is within ±0%, 0.1%, 0.5%, 1%, 2%, 3%, 4%, 5% or 10% of the value or relative characteristic.

It should also be appreciated that integer ranges explicitly include all intervening integers. For example, the integer range 1-10 explicitly includes 1, 2, 3, 4, 5, 6, 7, 8, 9, and 10. Similarly, the range 1 to 100 includes 1, 2, 3, 4 . . . . 97, 98, 99, 100. Similarly, when any range is called for, intervening numbers that are increments of the difference between the upper limit and the lower limit divided by 10 can be taken as alternative upper or lower limits. For example, if the range is 1.1. to 2.1 the following numbers 1.2, 1.3, 1.4, 1.5, 1.6, 1.7, 1.8, 1.9, and 2.0 can be selected as lower or upper limits. In the specific examples set forth herein, concentrations, temperature, and reaction conditions (e.g. pressure, pH, etc.) can be practiced with plus or minus 50 percent of the values indicated rounded to three significant figures. In a refinement, concentrations, temperature, and reaction conditions (e.g., pressure, pH, etc.) can be practiced with plus or minus 30 percent of the values indicated rounded to three significant figures of the value provided in the examples. In another refinement, concentrations, temperature, and reaction conditions (e.g., pH, etc.) can be practiced with plus or minus 10 percent of the values indicated rounded to three significant figures of the value provided in the examples.

In the examples set forth herein, concentrations, temperature, and reaction conditions (e.g., pressure, pH, flow rates, etc.) can be practiced with plus or minus 50 percent of the values indicated rounded to or truncated to two significant figures of the value provided in the examples. In a refinement, concentrations, temperature, and reaction conditions (e.g., pressure, pH, flow rates, etc.) can be practiced with plus or minus 30 percent of the values indicated rounded to or truncated to two significant figures of the value provided in the examples. In another refinement, concentrations, temperature, and reaction conditions (e.g., pressure, pH, flow rates, etc.) can be practiced with plus or minus 10 percent of the values indicated rounded to or truncated to two significant figures of the value provided in the examples.

For all compounds expressed as an empirical chemical formula with a plurality of letters and numeric subscripts (e.g., $CH_2O$), values of the subscripts can be plus or minus 50 percent of the values indicated rounded to or truncated to two significant figures. For example, if $CH_2O$ is indicated, a compound of formula $C_{(0.8-1.2)}H_{(1.6-2.4)}O_{(0.8-1.2)}$. In a refinement, values of the subscripts can be plus or minus 30 percent of the values indicated rounded to or truncated to two significant figures. In still another refinement, values of the subscripts can be plus or minus 20 percent of the values indicated rounded to or truncated to two significant figures.

Throughout this application, where publications are referenced, the disclosures of these publications in their entireties are hereby incorporated by reference into this application to more fully describe the state of the art to which this invention pertains.

Abbreviations:

"AA" means acrylic acid.

"BA" means butyl acrylate.

"EHA" means ethyl hexyl acrylate

"MAA" means methacrylic acid.

"MMA" means methyl methacrylate.

The term "methacrylate" refers to acrylate and/or methacrylate.

The term "amphoteric surfactant" refers to a surfactant simultaneously carrying an anionic group and a cationic group. In a refinement, an amphoteric surfactant" is a surfactant having the capacity to act as either an acid or a base, i.e., functioning as a cationic material in an acid medium and as an anionic material in an alkaline medium.

The term "(meth)acrylate copolymer" means a copolymer which includes in polymerized form at least 80 weight percent (meth)acrylate monomers and (meth)acrylic acid monomers.

The term "(meth)acrylic acid monomer" refers to acrylic acid, methacrylic acid and substituted derivatives thereof.

The term "(meth)acrylate monomers" refers to monovinyl acrylate and methacrylate monomers. The (meth)acrylates can include esters, amides and substituted derivatives thereof. In a refinement, (meth)acrylates are $C_1$-$C_8$ alkyl acrylates and methacrylates.

The term "residue" as used herein means that portion of a compound that remains after reaction. In the context of the present invention, a residue is that portion of a compound remaining in the acrylic emulsion.

In an embodiment, a method for forming an acrylic emulsion is provided. The method includes a step of polymerizing a pre-emulsion by combining a monomer composition with an amphoteric surfactant in water. As set forth below in more detail, the monomer composition includes one or more monomers selected from the group consisting of (meth)acrylic acid monomers and (meth)acrylic monomers and combinations thereof. The pre-emulsion is polymerized by combining the pre-emulsion with an initiator in a reactor to form a reaction mixture. In a refinement, the amphoteric surfactant is present in an amount from about 0.5% to 5% of the weight of the monomer composition. Polymerization is then allowed to proceed for a predetermined total polymerization time typically from about 1 to 20 hours to form a (meth)acrylate polymer or copolymer.

In one variation, the step of polymerizing the pre-emulsion includes a seeding step in which a portion of the pre-emulsion and a predetermined amount of initiator are added to the reaction mixture and allowed to react for a first predetermined time period at a first predetermined temperature. In a refinement, the first predetermined time period is from about 10 minutes to 2 hours and the first predetermined temperature from about 70° C. to about 100° C. In this variation, an additional amount of the pre-emulsion and the radical initiator is added to the reaction mixture over a second predetermined time period at a second predetermined temperature with mixing. In a refinement, the second predetermined time period is from about 1 hour to 10 hours and the second predetermined temperature from about 70° C. to about 100° C. A chaser is then added to the reaction mixture at a third predetermined temperature. The polymerization is then allowed to complete over a third predetermined time period. The chaser can potentially scavenge any unreacted monomer. In a refinement, the third period of time is from about 5 minutes to 2 hours and the third temperature from about 40° C. to about 70° C. After the mixture is allowed to cool (typically to room temperature), a neutralizing agent (e.g., ammonia) and optional additional additives can be added to the reaction mixture.

A "final emulsion composition" as used herein refers to a composition that includes all of the components that have been added to the reaction mixture including the neutralizing agent and any additives set forth herein. In a variation, in the final emulsion composition, the monomer composition is present in an amount from about 35 to 65 weight percent of the final emulsion composition, the amphoteric surfactant is present in an amount from about 0.05 to 5 weight percent of the total weight of the final emulsion composition, and the radical initiator is present in an amount from about 0.05 to 1 weight percent of the total weight of the final emulsion composition with the balance being water. In a refinement, the chaser is present in an amount from about 0.05 to 1 weight percent of the total weight of the final emulsion composition. In a further refinement, the neutralizer is present in an amount of about 0.05 to 3 weight percent of the total weight of the final emulsion composition and/or the biocide 0.5 to 5 weight percent of the total weight of the final emulsion composition and/or defoamer present in an amount of about 0.002 to 1 weight percent of the total weight of the final emulsion composition and/or adhesion promoter present in an amount from about 0.5 to about 5 weight percent of the total weight of the final emulsion composition.

Although the present invention does not depend on any particular theory of operation, it is believed that upon drying of the paint film (formed from paint compositions including the acrylic emulsion set forth herein) the positive charge of nitrogen in amphoteric surfactant interact with tannin and block it's bleeding to the surface of the paint film ultimately reducing the staining. Similarly, it is believed that the same charge helps to improve the corrosion resistance of primer formulations. The amphoteric surfactants used herein can be pH-sensitive or not pH sensitive. In a refinement, the amphoteric surfactant includes an amino group and at least one carboxylate group. In a further refinement, the amino group is a secondary amino group, a tertiary amino group, or a quaternary amine group (e.g., as found in betaines). Examples of amphoteric surfactants include, but are not limited to, di sodium lauriminodipropionate, dodecylbetaine, tetradecylbetaine, ($c_{12-14}$alkyl)betaine, hexadecylbetaine, cocoamphodiacetates, cocoiminodipropionate, dodecyliminodipropionate, cocoamidopropylbetaine, cocoamidopropyldimethyl-hydroxysulphobetaine. The use of amphoteric surfactants, and in particular, the use of positively charged nitrogen in the amphoteric surfactant is responsible for improved performance.

As set forth above, the emulsion polymerization is initiated by radical initiators that generate free radical upon exposure to heat or light which initiate polymerization. The radical initiator can be a water-soluble initiator or an oil-soluble initiator. Water-soluble initiators are preferred. Suitable water-soluble radical initiators include, but are not limited to, persulfates (e.g., potassium persulfate, ammonium persulfate, sodium persulfate, and mixtures thereof), oxidation-reduction initiators, and combinations thereof. The oxidation-reduction initiator can be the reaction product of persulfates (e.g., potassium persulfate, ammonium persulfate, sodium persulfate, and mixtures thereof) and reducing agents. Examples of reducing agents include sodium metabisulfite and sodium bisulfite; and 4,4'-azobis(4-cyanopentanoic acid) and its soluble salts (e.g., sodium, potassium). Suitable oil-soluble radical initiators include, but are not limited to, azo-compounds such as 2,2'-azobis(isobutyronitrile)) and 2,2'-azobis(2,4-dimethylpentanenitrile. Additional radical initiators can be organic peroxides, metal iodides, and metal alkyls, and combinations thereof. Moreover, the radical initiators set forth herein can also be used for the chaser. It should be appreciated that each of the combination of the initiators set forth above can also be used.

As set forth above, the monomer composition includes (meth)acrylic acid monomers and (meth)acrylic monomers. The (meth)acrylic acid monomers include acrylic acid, methacrylic acid and substituted derivatives thereof. Examples of the (meth)acrylic monomers include, but are not limited to, methyl acrylate, methyl methacrylate, ethyl acrylate, ethyl methacrylate, butyl acrylate, butyl methacrylate, 2-ethylhexyl acrylate, decyl acrylate, lauryl methacrylate, methyl methacrylate, butyl methacrylate, stearyl methacrylate, isobornyl methacrylate, cyclohexyl methacrylate, isodecyl methacrylate, lauryl methacrylate, hydroxyethyl methacrylate, hydroxypropyl methacrylate, and combinations thereof. In a refinement, the monomer composition includes butyl acrylate, ethyl hexyl acrylate, methyl methacrylate, acrylic acid, and methacrylic acid.

In another embodiment, an acrylic emulsion formed by the methods set forth above is provided. The acrylic emulsion includes water, an acrylic polymer or copolymer, and an amphoteric surfactant typically present in an amount from 0.5% to 5% of the weight of the first acrylic polymer or copolymer. Characteristically, the acrylic polymer or copolymer is formed by polymerizing the monomer compositions set forth above. Consistent with the methods set forth above, the acrylic emulsion can include the adhesion promoter, the defoamer, the biocide, the initiator, the chaser, and the neutralizing agent or residues of each of these components. Details of the amphoteric surfactant and all other components of the acrylic emulsion as the same as set forth above.

In a variation, acrylic polymer or copolymer is present in an amount from about 35 to 65 weight percent of the acrylic emulsion, the amphoteric surfactant is present in an amount from about 0.05 to 5 weight percent of the total weight of the acrylic emulsion, and the radical initiator or residue thereof is present in an amount from about 0.05 to 1 weight percent of the total weight of the acrylic emulsion with the balance being water. In a refinement, the chaser or residue thereof is present in an amount from about 0.05 to 1 weight percent of the total weight of the acrylic emulsion. In a further refinement, the biocide or residue thereof is present in an amount from about 0.5 to 5 weight percent of the total weight of the acrylic emulsion and/or defoamer or residue thereof is present in an amount from about 0.002 to 1 weight percent of the total weight of the acrylic emulsion and/or the adhesion promoter or residue thereof is present in an amount from about 0.5 to about 5 weight percent of the total weight of the acrylic emulsion.

The following examples illustrate the various embodiments of the present invention. Those skilled in the art will recognize many variations that are within the spirit of the present invention and scope of the claims.

EXAMPLE: Emulsion Polymerization—Control Latex

A control latex was synthesized in accordance to the recipe set forth in Table 1.

TABLE 1

Standard composition

| Standard | | |
|---|---|---|
| Monomer Composition | Name | Loading (g) |
| Monomer 1 | Butyl acrylate, (BA) | 252.17 |
| Monomer 2 | Ethyl hexyl acrylate (EHA) | — |
| Monomer 3 | Methyl methacrylate, (MMA) | 205.49 |
| Monomer 4 | Acrylic acid (AA) | — |
| Monomer 5 | Methacrylic acid, (MAA) | 4.83 |
| Monomer 6 | Adhesion promoter-1 | 19.55 |
| Monomer 7 | Adhesion promoter-2 | — |
| Total Monomer | | 482.04 |
| Other Ingredients | Name | Loading (g) |
| Emulsifier | Sodium lauryl sulphate (SLS) | 5.72 |
| Initiator | Water soluble initiator | 1.24 |
| Base/Buffer | Sodium carbonate | 1.91 |
| Defoamer | Silicone based defoamer | 0.01 |
| Water | DI water | 502.18 |

TABLE 1-continued

Standard composition

| Standard | | |
|---|---|---|
| Chaser | Reducing agent | 0.82 |
| Chaser | Oxidizing agent | 0.86 |
| Neutralizer | Ammonia solution | 1.43 |
| Preservative | Biocide | 3.81 |
| Total weight (g) | | 1000.02 |

The process of latex preparation is as follows:

Step I: Pre-Emulsion Preparation

The pre-emulsion was made in a conical flask with 1000 mL capacity. 222.15 mL water was added to 0.95 g of sodium carbonate followed by 3.34 g of SLS surfactant and stirred at 200 rpm using an overhead stirrer. While stirring at 200 rpm, 232.17 g n-butyl acrylate and 225.49 g of methyl methacrylate were added. The speed was then increased to 500 rpm and then 4.83 g of methacrylic acid and 19.55 g of Adhesion promoter-1 was added. The mixture was then stirred at 500 rpm for 30 min.

Step II: Reactor Set Up

In a 2.5 L reactor was added 195.46 mL water, 0.95 g of sodium carbonate, and 2.38 g of SLS. The reactor is then set to a temperature of 80-84° C. and stirred at 150 rpm.

Step III: Initiator and Chaser Preparation

The initiator solution was prepared by adding 1.24 g of water-soluble initiator to 47.67 mL water. The chaser was prepared by adding 0.82 g of reducing agent to 10.49 mL water and 0.86 g of oxidizing agent to 10.49 mL of water.

Step IV: Addition of Reactants and Conditions

The seeding step was performed by adding a predetermined amount of pre-emulsion and a fixed amount of initiator to the reactor. The mixture was stirred at 82° C. for 20-30 min. The solution showed a purple/blue tint, confirming initiation of the reaction.

The remaining pre-emulsion was added in 4 to 6 hours using a peristaltic pump and the initiator added in 5 to 6 hours via syringe pump. The addition was performed at 150 RPM and 80-84° C. After complete addition the mixture was stirred for an additional 30 minutes at 80-84° C. The reactor temperature was lowered to 55-60° C. and then the chasers were added over 10 min and the mixture was kept at 50-60° C. for 1 hour. Reaction was cooled to room temperature and then 0.01 g of defoamer, 1.43 g of ammonia solution and 3.81 g of biocide was added. The resin was filtered via 150-200 micron mesh and the following QC properties were measured: pH, particle size and % solid.

Example of Latex Synthesis with Amphoteric Surfactant

The control procedure was followed, except that equal amounts of active content of amphoteric surfactant was used instead of SLS.

Example of Latex Synthesis without Adhesion Promoter

The control procedure was followed, except that Adhesion promoter-1 was replaced with normal monomer like BA/EHA/EA or MMA.

Example of Latex Synthesis with Change of Adhesion Promoter

The control procedure was followed, except that Adhesion promoter-2 was used instead of Adhesion promoter-1.

Table 2 provides different examples for the synthesis of latex with aforementioned changes.

TABLE 2

Examples of latex synthesis

| | | Standard (AM 5) | With amphoteric surfactant AM 6 | Without adhesion promoter AM 3 | Without adhesion promoter + amphoteric surfactant AM 4 | Change in adhesion promoter AM 1 | Change in adhesion promoter + amphoteric surfactant AM 2 |
|---|---|---|---|---|---|---|---|
| | Name | Loading (g) | Loading (g) | Loading (g) | Loading (g) | Loading (g) | Loading (g) |
| Monomer Composition | | | | | | | |
| Monomer 1 | Butyl acrylate (BA) | 252.17 | 243.5 | 244 | 244 | 235 | 235 |
| Monomer 2 | Ethyl hexyl acrylate (EHA) | — | — | — | — | — | — |
| Monomer 3 | Methyl methacrylate, (MMA) | 205.49 | 236.5 | 257 | 257 | 261 | 261 |
| Monomer 4 | Acrylic acid (AA) | — | — | — | — | — | — |
| Monomer 5 | Methacrylic acid, (MAA) | 4.83 | 5.07 | 5.07 | 5.07 | 3.75 | 3.75 |
| Monomer 6 | Adhesion promoter-1 | 19.55 | 20.5 | — | — | — | — |
| Monomer 7 | Adhesion promoter-2 | — | — | — | — | 5.12 | 5.12 |
| Total Monomer | | 482.04 | 505.57 | 506.07 | 506.07 | 504.87 | 504.87 |
| Other Ingredients | | | | | | | |
| Emulsifier | Sodium lauryl sulphate (SLS) | 5.72 | — | 6.0 | — | 6.0 | — |
| Emulsifier | Amphoteric surfactant | — | 20.37 | — | 20.37 | — | 20.37 |
| Initiator | Water soluble initiator | 1.24 | 1.3 | 1.3 | 1.3 | 1.3 | 1.3 |
| Base/Buffer | Sodium carbonate | 1.91 | 2.0 | 2.0 | 2.0 | 2.0 | 2.0 |
| Defoamer | Silicone based defoamer | 0.01 | 0.01 | 0.01 | 0.01 | 0.01 | 0.01 |
| Water | DI water | 502.18 | 476 | 528.7 | 521 | 527.5 | 513.3 |
| Chaser 1 | Reducing agent | 0.82 | 0.86 | 0.86 | 0.86 | 0.86 | 0.86 |
| Chaser 2 | Oxidizing agent | 0.86 | 0.9 | 0.9 | 0.9 | 0.9 | 0.9 |
| Neutralizer | Ammonia solution | 1.43 | 1.5 | 1.5 | 1.5 | 1.5 | 1.5 |
| Preservative | Biocide | 3.81 | 4.0 | 4.1 | 4.1 | 4.1 | 4.1 |
| Total weight (g) | | 1000.02 | 1012.5 | 1051.43 | 1058.1 | 1049.03 | 1049.2 |

Paint Formula Containing the Synthesized Latex

The latexes were evaluated in the BEHR PREMIUM PLUS® formula. The existing latex was replaced with synthesized latex. The standard method is used to produce the paint formulations except the substitution of the latex with the synthesized latexes.

Evaluation of Tannin Blocking of the Exterior Multi-Surface Primer Samples

The paint samples of standard and synthesized latexes were applied on the redwood panel with equal spread rate and half of the portion was top coated with a BEHR's topcoat paint after drying. The painted redwood was dried overnight and kept in a humidity chamber for 4 to 6 days.

Evaluation of Corrosion Resistance the Exterior Multi-Surface Primer Samples

Films were casted on steel panels for corrosion testing along with standard as control. An 'X' was made with cutter on the paint and panels were kept in Q fog chamber having wet and dry cycles with salt spray.

Evaluation of Adhesion onto Alkyd Surface of the Exterior Multi-Surface Primer Samples Films were casted onto dried alkyd paint and adhesion of paint samples was tested according to ASTM-D3359.

Evaluation of Stain Blocking of the Exterior Multi-Surface Primer Samples

Drawdowns were casted on the stains (hydrophilic and hydrophobic) which were previously applied and dried on flat sheen Behr paint. Topcoats were applied across casted samples after 4 hrs. and after 1 day at different portions.

Tannin Blocking Results

All samples containing amphoteric surfactant were better than SLS in tannin blocking.

Corrosion Resistance Results

All samples containing amphoteric surfactant were better than SLS in corrosion resistance.

Adhesion on Alkyd Surface

All samples containing amphoteric surfactant were better than samples containing SLS in adhesion onto alkyd surface.

Stain Blocking

Amphoteric surfactant showed improvement in stain blocking in some formulas.

TABLE 3

Results for the paint testing (comparison between the two types of surfactants)

| Properties | With amphoteric surfactant | With SLS as surfactant |
| --- | --- | --- |
| Tannin resistance | Better | Poor |
| Adhesion on alkyd paint | Better | Poor |
| Corrosion Resistance | Better | Poor |
| Stain blocking | Slightly better | Slightly weak |

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. An acrylic emulsion comprising:
water;
an acrylic copolymer formed from a monomer composition consisting of butyl acrylate, methyl methacrylate, methacrylic acid, and an adhesion promoter, the adhesion promoter being present in an amount from about 0.5 to about 5 weight percent of the total weight of the acrylic emulsion composition;
an amphoteric surfactant present in an amount from 0.5% to 5% of the weight of the acrylic copolymer;
a chaser that scavenges unreacted monomer or residues thereof, the chaser including a reducing agent; and
residues of a radical initiator that is an oxidation-reduction initiator which is the reaction product of persulfates and reducing agents, wherein the acrylic copolymer is present in an amount from about 35 to 65 weight percent of the acrylic emulsion, the amphoteric surfactant is present in an amount from about 0.05 to 5 weight percent of the total weight of the acrylic emulsion, and the residues of the radical initiator are present in an amount from about 0.05 to 1 weight percent of the total weight of the acrylic emulsion with the balance being water.

2. The acrylic emulsion of claim 1 wherein the amphoteric surfactant includes an amino group and at least one carboxylate group.

3. The acrylic emulsion of claim 2 wherein the amino group is a secondary amino group, a tertiary amino group, or a quaternary amine group.

4. The acrylic emulsion of claim 2 wherein the amphoteric surfactant includes a component selected from the group consisting of disodium lauriminodipropionate, dodecylbetaine, tetradecylbetaine, ($C_{12-44}$alkyl)betaine, hexadecylbetaine, cocoamphodiacetates, co co iminodiprop ionate, dodecyliminodipropionate, cocoamidopropylbetaine, cocoamidopropyldimethyl-hydroxysulphobetaine, and combinations thereof.

5. The acrylic emulsion of claim 1 wherein the acrylic copolymer is formed from one or more monomers selected from the group consisting of acrylic acid, methacrylic acid, and combinations thereof.

6. The acrylic emulsion of claim 1 wherein the acrylic copolymer is formed from butyl acrylate, ethyl hexyl acrylate, methyl methacrylate, acrylic acid, and methacrylic acid.

7. The acrylic emulsion of claim 1 wherein the acrylic copolymer is present in an amount from about 35 to 65 weight percent of the acrylic emulsion, the amphoteric surfactant is present in an amount from about 0.05 to 5 weight percent of the total weight of the acrylic emulsion, and the residues of a radical initiator is present in an amount from about 0.05 to 1 weight percent of the total weight of the acrylic emulsion with the balance being water.

8. The acrylic emulsion of claim 1 wherein the chaser that scavenges unreacted monomer or residues thereof is present in an amount from about 0.05 to 1 weight percent of the total weight of the acrylic emulsion.

* * * * *

UNITED STATES PATENT AND TRADEMARK OFFICE
CERTIFICATE OF CORRECTION

| | | |
|---|---|---|
| PATENT NO. | : 12,043,677 B2 | Page 1 of 1 |
| APPLICATION NO. | : 17/008357 | |
| DATED | : July 23, 2024 | |
| INVENTOR(S) | : Deepak Mishra et al. | |

It is certified that error appears in the above-identified patent and that said Letters Patent is hereby corrected as shown below:

In the Claims

Column 12, Line 16, Claim 4:
After "cocoamphodiacetates,"
Delete "co co iminodiprop ionate" and
Insert -- cocoiminodipropionate --.

Signed and Sealed this
Thirtieth Day of September, 2025

John A. Squires
*Director of the United States Patent and Trademark Office*